United States Patent
Born et al.

[11] Patent Number: 6,004,425
[45] Date of Patent: Dec. 21, 1999

[54] RUBBER-BASED STRUCTURAL WHITE-SHELL ADHESIVES

[75] Inventors: Peter Born, Sandhausen; Frank Dittrich, Sinsheim, both of Germany

[73] Assignee: Henkel-Teroson GmbH, Heidelberg, Germany

[21] Appl. No.: 08/875,825

[22] PCT Filed: Jan. 18, 1996

[86] PCT No.: PCT/EP96/00194

§ 371 Date: Jul. 25, 1997

§ 102(e) Date: Jul. 25, 1997

[87] PCT Pub. No.: WO96/23040

PCT Pub. Date: Aug. 1, 1996

[30] Foreign Application Priority Data

Jan. 26, 1995 [DE] Germany .......................... 195 02 381

[51] Int. Cl.$^6$ .................. C09J 127/06; C09J 131/04; C09J 109/00

[52] U.S. Cl. .................. 156/333; 156/334; 427/385.5; 427/388.2; 525/193; 525/194; 525/196; 525/222; 525/227; 525/235; 525/313; 524/433; 524/523; 524/524; 524/525; 524/527; 524/534

[58] Field of Search ...................... 525/193, 194, 525/196, 222, 227, 235, 313; 156/333, 334; 427/388.2, 385.5; 524/523, 524, 534, 433, 525, 527

[56] References Cited

U.S. PATENT DOCUMENTS 3,615,448  10/1971  Yeshin .
4,210,567   7/1980  Kösters ................. 260/31.8 R
4,900,771   2/1990  Gerace et al. .......... 524/296
5,760,135   6/1998  Korpman ................. 525/95

FOREIGN PATENT DOCUMENTS 2 000 569   4/1990  Canada .
0 097 394   1/1984  European Pat. Off. .
0 309 903   4/1989  European Pat. Off. .
0 441 244   8/1991  European Pat. Off. .
0 524 058   1/1993  European Pat. Off. .
24 54 235   5/1976  Germany .
38 34 818  11/1989  Germany .
40 27 064   4/1992  Germany .
40 34 725   5/1992  Germany .
   056597   5/1975  Japan .
   044861   4/1977  Japan .
   201384   8/1989  Japan .

OTHER PUBLICATIONS

Int. J. Adhesion and Adhesives 4(4): 148–150 (1984).
DIN 53504 (1994).

*Primary Examiner*—David Buttner
*Attorney, Agent, or Firm*—Ernest G. Szoke; Wayne C. Jaeschke; Stephen D. Harper

[57] ABSTRACT

One-component hot-curing structural adhesives based on liquid rubbers, which may optionally contain functional groups, solid rubbers, thermoplastic polymer powders and sulfur and also vulcanization accelerators are suitable for bonding metal parts. Tensile shear strengths of more than 15 MPa and high breaking elongations of more than 15% can be obtained. These adhesives are substantially free from low molecular weight epoxy resins and are particularly suitable for use in white-shell assembly in the car industry.

34 Claims, No Drawings

RUBBER-BASED STRUCTURAL WHITE-SHELL ADHESIVES

This invention relates to one-component, hot-curing compositions based on liquid rubbers and fine-particle powder-form thermoplastic polymers and to their production and use as structural adhesives with a breaking elongation of more than 15%.

BACKGROUND OF THE INVENTION

In modern assembly techniques for joining metal components in machine construction, vehicle or equipment manufacture, more especially in car manufacture, conventional methods of fixing, such as riveting, screwing or welding, are being increasingly replaced by bonding. Spot welding above all, which is a source of future corrosion, is being displaced as far as possible or is being applied in combination with structural adhesives. For this reason, there is an increased demand for high-strength structural adhesives. For assembly reasons, these adhesives have to be used at the so-called white-shell stage of car manufacture, i.e. the adhesives are generally applied to the uncleaned metal surface. These surfaces are often coated with various corrosion-inhibiting oils and drawing oils, so that the adhesives used there should not be functionally affected by these oils. In addition, the adhesives should be capable of withstanding—preferably without pregelation—the various washing baths and installations and the high temperatures of up to around 240° C. prevailing in the baking ovens for electrocoating and should also cure at temperatures of that order. Moreover, the adhesives are required to exhibit good ageing-resistant adhesion to various galvanized steels, for example electrolytically galvanized steel plates, hot-dip galvanized steel plates and the corresponding galvannealed steel plates or galvanized and subsequently phosphated steel plates. Structural adhesives for these applications must also have a minimum strength of about 15 MPa. In the interests of smooth assembly line operation, only one-component materials capable of being transported by pumps and applied by machine are suitable.

On account of the demanding strength requirements, one-component hot-curing epoxy adhesives have mainly been used for these applications in the past. Apart from the advantages of high tensile strength, however, epoxy adhesives have a number of major disadvantages. The paste-like, hot-curing one-component epoxy adhesives do not show adequate resistance to washing in the washing and phosphating baths, so that the corresponding bonds normally have to be pregelled by induction heating or in special ovens. Unfortunately, this involves an additional step. Attempts have been made to overcome this by developing one-component hot-curing epoxy adhesives resembling hotmelts in character. Unfortunately, these adhesives require special application systems because they have to be applied hot. Another general disadvantage of epoxy adhesives is their tendency to absorb moisture under the effect of high atmospheric humidity which can lead to corrosion phenomena and weakening of the bond in the bond line. Although epoxy adhesives are distinguished by high tensile strength, their breaking elongation is generally very poor; even epoxy adhesives flexibilized by addition of rubber have a breaking elongation of less than 5%. In addition, the use of epoxy adhesives based on low molecular weight epoxy compounds (molecular weight<700) is undesirable on industrial hygiene grounds because these low molecular weight epoxy compounds can initiate allergic or sensitizing reactions on contact with the skin.

For some time, compositions based on vulcanizable rubbers have been used as an alternative. EP-B-97 394 describes an adhesive mixture based on a liquid polybutadiene rubber, powder-form sulfur, organic accelerators and optionally solid rubber. According to B. D. Ludbrook, Int. J. Adhesion and Adhesives, Vol. 4, No. 4, pages 148–150, corresponding adhesives based on liquid polybutadienes are capable of attaining strength levels equivalent to those of flexibilized epoxy adhesives through an appropriate choice of the quantity of sulfur and accelerators. Whereas these formulations have good curing properties and show high resistance to ageing and even adhere acceptably to normal oiled steel plate, their usefulness for various galvanized steel plates is limited, in addition to which the breaking elongation of these high-strength rubber adhesives is very poor.

To improve adhesion, DE-C-38 34 818 proposes using OH-terminated polybutadienes for the liquid rubber. According to EP-B-441 244, homopolymers or copolymers containing thiol, amino, amido, carboxyl, epoxy, isocyanate, anhydride or acetoxy groups may be used in addition to hydroxyfunctional homopolymers or copolymers as the functional rubber polymer, although the cured adhesive mixture has a breaking elongation of no more than 15%.

According to EP-B-309 903 and DE-C-40 27 064, polyfunctional epoxy compounds may be added to the adhesive mixtures based on liquid rubbers to improved adhesion and tensile shear strength. Apart from the fact that it is undesirable for the reasons explained above to use adhesive compositions containing epoxy resin, the adhesive compositions disclosed in the last two documents are not suitable as structural adhesives because they only reach a very low strength level of at most 3 MPa.

BRIEF DESCRIPTION OF THE SEVERAL VIEWS OF THE DRAWINGS

Not applicable.

DETAILED DESCRIPTION OF THE INVENTION

Accordingly, the problem addressed by the present invention was to provide adhesives and sealants which could be used with advantage for joining metal parts in automobile shells ("white shells") and which would show adequate permanent adhesion on a number of the metal surfaces used today without any need for cleaning pretreatments, could be used as structural adhesives (structural adhesives in the context of the invention being adhesives which attain a strength of at least 15 MPa in tensile shear tests), would have a breaking elongation according to DIN 53504 of more than 15% and preferably more than 20%, in addition to which the materials would comprise one component, would be hot-curing and would cure at temperatures of 160° C. to 240° C., their strength properties not being significantly affected by the curing temperature.

Apart from normal oiled steel plates, substrates on which adhesion must be obtained include, in particular, the various galvanized and oiled steel plates and aluminium.

According to B. D. Ludbrook loc. cit., the strength values of rubber-vulcanized adhesives can be significantly increased by the quantity of sulfur and accelerator, but always to the detriment of breaking elongation. It has surprisingly been found that the addition of fine-particle powders of thermoplastic polymers to adhesives based on liquid rubbers not only increases tensile shear strength, it also significantly improves breaking elongation. Since the other properties, for example ageing resistance and adhesive behavior on the substrates mentioned above, are not affected by the addition of the thermoplastic polymer powder, the adhesives in question are very much more universal in their usefulness. Thus, structural adhesives may even used for the first time where, hitherto, it has only been possible to use adhesives with lower strength levels on account of the high elasticity required, as is the case for example with lining adhesives for bonding inner panels to outer panels in car manufacture where high torsional rigidity is required for structural reasons.

The adhesive/sealant compositions according to the invention contain at least one of the following substances:

one or more liquid rubbers and/or solid rubbers or elastomers fine-particle powders of thermoplastic polymers vulcanization agents, vulcanization accelerators, catalysts fillers tackifiers and/or primers extender oils antiagers flow aids.

Liquid rubbers or elastomers may be selected from the following group of homopolymers and/or copolymers:

Polybutadienes, more particularly 1,4- and 1,2-polybutadienes, polybutenes, polyisobutylenes, 1,4- and 3,4-polyisoprenes, styrene/butadiene copolymers, butadiene/acrylonitrile copolymers; these polymers may have terminal and/or (statistically distributed) lateral functional groups. Examples of such functional groups are hydroxy, amino, carboxyl, carboxylic anhydride or epoxy groups. The molecular weight of these liquid rubbers is typically below 20,000 and preferably between 900 and 10,000. The percentage content of liquid rubber in the composition as a whole depends upon the required rheology of the uncured composition and the required mechanical properties of the cured composition. The percentage content of liquid rubber or elastomer normally varies between 5 and 50% by weight, based on the formulation as a whole. It has proved to be useful in this regard to employ mixtures of liquid rubbers differing both in their molecular weight and in their configuration in relation to the remaining double bonds. To achieve optimal adhesion on various substrates, a liquid rubber component containing hydroxyl groups or anhydride groups is used in the particularly preferred formulations. At least one of the liquid rubbers should have a high percentage content of cis-1,4-double bonds while another liquid rubber should have a high percentage of vinyl double bonds.

By comparison with liquid rubbers, suitable solid rubbers have a significantly higher molecular weight (MW=100,000 or higher). Examples of suitable rubbers are polybutadiene, preferably with a very high percentage of cis-1,4-double bonds (typically above 95%), styrene/butadiene rubber, butadiene/acrylonitrile rubber, synthetic or natural isoprene rubber, butyl rubber or polyurethane rubber.

The addition of fine-particle thermoplastic polymer powders produces a significant improvement in tensile shear strength while maintaining a very high breaking elongation hitherto untypical of structural adhesives. Thus, tensile shear strengths of more than 15 MPa can be achieved for breaking elongations well above 15% and, very often, above 20%. The high-strength structural adhesives hitherto typically used were based on epoxy resins which only have breaking elongations of less than 5%, even as flexibilized adhesive formulations. The combination of high tensile shear strength values with high breaking elongation is attributed to the addition of thermoplastic polymer powders in accordance with the invention. According to the invention, numerous thermoplastic polymer powders are suitable additives, including for example vinyl acetate either in the form of a homopolymer or in the form of a copolymer with ethylene and other olefins and acrylic acid derivatives, polyvinyl chloride, vinyl chloride/vinyl acetate copolymers, styrene copolymers of the type described, for example, in DE-A-40 34 725, polymethyl methacrylate and copolymers thereof with other (meth)acrylates and functional comonomers, for example of the type described in DE-C-24 54 235, or polyvinyl acetals, for example polyvinyl butyral. Although the particle size or rather particle size distribution of the polymer powders does not appear to be particularly critical, the average particle size should be below 1 mm, preferably below 350 $\mu$m and, more preferably, between 100 and 20 $\mu$m. Polyvinyl acetate and copolymers based on ethylene/vinyl acetate (EVA) are most particularly preferred. The quantity of thermoplastic polymer powder added is determined by the required strength range and is between 2 and 20% by weight, based on the composition as a whole, a particularly preferred range being from 10 to 15%.

Since the crosslinking or curing reaction of the rubber composition has a critical influence on the tensile shear strength and breaking elongation of the cured adhesive composition, the vulcanization system has to be selected and adapted with particular care. Various vulcanization systems based on elemental sulfur and vulcanization systems with no free sulfur may be used. Vulcanization systems with no free sulfur include those based on thiuram disulfides, organic peroxides, polyfunctional amines, quinones, p-benzoquinone dioxime, p-nitrosobenzene and dinitrosobenzene and also systems crosslinked with (blocked) diisocyanates. Vulcanization systems based on elemental sulfur and organic vulcanization accelerators and also zinc compounds are most particularly preferred. The powder-form sulfur is used in quantities of 4 to 15% by weight, based on the composition as a whole, quantities of 6 to 8% being particularly preferred. Suitable organic accelerators are the dithiocarbamates (in the form of their ammonium or metal salts), xanthogenates, thiuram compounds (monosulfides and disulfides), thiazole compounds, aldehyde/amine accelerators (for example hexamethylenetetramine) and also guanidine accelerators, dibenzothiazyl disulfide (MBTS) being most particularly preferred. These organic accelerators are used in quantities of 2 to 8% by weight, based on the formulation as a whole, and preferably in quantities of 3 to 6%. In the case of zinc compounds acting as accelerators, a choice may be made between the zinc salts of fatty acids, zinc dithiocarbamates, basic zinc carbonates and, in particular, fine-particle zinc oxide. The content of zinc compounds is in the range from 1 to 10% by weight and preferably in the range from 3 to 7% by weight. In addition, other typical rubber vulcanization agents, for example fatty acids (for example stearic acid), may be present in the formulation.

Although, in general, the compositions according to the invention already show very good adhesion to the substrates to be bonded by virtue of the presence of liquid rubber containing functional groups, tackifiers and/or primers may be added where necessary. Suitable tackifiers and/or primers are, for example, hydrocarbon resins, phenolic resins, terpene/phenol resins, resorcinol resins or derivatives thereof, modified or unmodified resinic acids or esters (abietic acid derivatives), polyamines, polyaminoamides, anhydrides and anhydride-containing copolymers. The addition of polyepoxy resins in small quantities (<1% by weight) can also improve adhesion to some substrates. In this case, however, solid epoxy resins with a molecular weight well above 700 are preferably used in finely ground form so that the formulations are still substantially free from epoxy resins, more especially those with molecular weights below 700. If tackifiers or primers are used, the type and quantity used will depend upon the polymer composition of the adhesive/sealant, upon the required strength of the cured composition and upon the substrate to which the composition is applied. Typical tackifying resin (tackifiers), for example terpene/phenol resins or resinic acid derivatives, are normally used in concentrations of 5 to 20% by weight while typical primers, such as polyamines, polyaminoamides or resorcinol derivatives, are used in concentrations of 0.1 to 10% by weight.

The compositions according to the invention are preferably free from plasticizers for the thermoplastic polymer. More particularly, they are free from phthalic acid esters. However, it may be necessary to influence the rheology of the uncured composition and/or the mechanical properties of the cured composition by addition of so-called extender oils, i.e. aliphatic, aromatic or naphthenic oils. However, this influence is preferably exerted through the appropriate choice of the low molecular weight liquid rubbers or through the use of low molecular weight polybutenes or polyisobutylenes. If extender oils are used, they are used in quantities of 2 to 15% by weight.

The fillers may be selected from a number of materials, including in particular chalks, natural ground or precipitated calcium carbonates, calcium/magnesium carbonates, silicates, heavy spar and also carbon black. Lamellar fillers, for example vermiculite, mica, talcum or similar layer silicates, are also suitable as fillers. It may be useful for the fillers to be at least partly surface-pretreated. Coating with stearic acid to reduce the moisture introduced and to prevent the cured composition from becoming sensitive to moisture have proved to be particularly useful for the various calcium carbonates or chalks. In addition, the compositions according to the invention generally contain between 1 and 5% by weight of calcium oxide. The total content of fillers in the formulation can vary from 10 to 70% by weight and is preferably in the range from 25 to 60% by weight.

Conventional stabilizers, for example sterically hindered phenols or amine derivatives, may be used to prevent thermal, thermo-oxidative or ozone degradation of the compositions according to the invention, these stabilizers typically being used in quantities of 0.1 to 5% by weight.

Although the rheology of the compositions according to the invention can normally be brought into the required range through the choice of the fillers and the quantity ratio of the low molecular weight liquid rubbers, conventional rheology aids, for example pyrogenic silicas, Bentones or fibrillated or pulped chopped strands may be added in quantities of 0.1 to 7%. In addition, other conventional auxiliaries and additives may be used in the compositions according to the invention.

As mentioned at the beginning, a preferred application for the one-component hot-curing adhesive/sealant composition according to the invention is in white-shell assembly in the car industry, so that the compositions should cure in 10 to 35 minutes at temperatures of 80 to 240° C., temperatures of 160° C. to 200° C. preferably being applied in white-shell assembly. A major advantage of the compositions according to the invention over known paste-form one-component epoxy resin adhesives lies in their so-called "washing resistance" immediately after application of the adhesives, i.e. they do not require pregelation in the same way as the above-mentioned epoxy adhesives to be resistant to the various washing and phosphating baths used in white-shell assembly. The compositions according to the invention have the advantage over hotmelt epoxy adhesives that they need only be gently heated to around 30 to 45° C. for pumping and for application, in addition to which their wetting power for cold substrates is considerably better than that of epoxy hotmelts by virtue inter alia of their greater inherent tackiness.

EXAMPLES

The following Examples are intended to illustrate the invention without limiting it in any way.

To determine tensile shear strength, 1.5 mm thick strips of a 14 O5 steel measuring 25×100 mm were bonded with the adhesives with an overlap of 25×20 mm; the layer thickness of the adhesive was 0.2 mm. The steel strips had been oiled beforehand with ASTM Oil No. 1, coating weight 3 to 4 $g/m^2$. Breaking elongation and tear strength were determined on an S2 test specimen according to DIN 53 504, layer thickness 2 mm. A conventional laboratory tensile testing machine was used for both tensile tests (rate of advance 50 mm/min.). The adhesives were cured in a laboratory circulating-air oven, cure time: 30 mins. at 180° C.

In an evacuable laboratory kneader, the compositions identified in the following Tables were mixed in vacuo until they were homogeneous. Unless otherwise indicated, all parts in the Examples are parts by weight.

TABLE 1

|  | Example 1 | Comparison Example 1 | Comparison Example 2 |
|---|---|---|---|
| Polybutadiene, solid (1) | 5.0 | 5.0 | 5.0 |
| Polybutadiene, liquid (2) | 5.0 | 5.0 | 5.0 |
| Polybutadiene, liquid (3) | 15.0 | 15.0 | 15.0 |
| Polybutadiene, liquid (4) | 5.0 | 5.0 | 5.0 |
| Zinc oxide, active | 4.0 | 4.0 | 4.0 |
| Sulfur, powder | 7.0 | 5.0 | 7.0 |
| Dibenzothiazyl disulfide (MBTS) | 5.0 | 5.0 | 5.0 |
| Polyvinyl acetate, powder (5) | 10.0 | — | — |
| Calcium carbonate | 41.0 | 53.0 | 51.0 |
| Calcium oxide | 2.5 | 2.5 | 2.5 |
| Antioxidant | 0.5 | 0.5 | 0.5 |
| Tensile shear strength | 18.3 MPa | 8.2 MPa | 14.7 MPa |
| Breaking elongation | 26.0% | 57.3% | 4.96% |
| Tear strength | 16.5 MPa | 7.0 MPa | 14.5 MPa |

(1) Cis-1,4 at least 98%, Mooney viscosity 48 (ML4-100)
(2) MW about 1800, cis-1,4 about 72%
(3) MW about 1800, vinyl about 40–50%
(4) Polybutadiene/maleic anhydride adduct, MW about 1700
(5) EVA copolymer, Tg about 23° C.

TABLE 2

|  | Example 2 | Example 3 | Example 4 | Comparison Example 1 |
|---|---|---|---|---|
| Polybutadiene, solid (1) | 5.0 | 5.0 | 5.0 | 5.0 |
| Polybutadiene, liquid (2) | 5.0 | 5.0 | 5.0 | 5.0 |

TABLE 2-continued

|  | Example 2 | Example 3 | Example 4 | Comparison Example 1 |
|---|---|---|---|---|
| Polybutadiene, liquid (3) | 15.0 | 15.0 | 15.0 | 15.0 |
| Polybutadiene, liquid (4) | 5.0 | 5.0 | 5.0 | 5.0 |
| Zinc oxide, active | 4.0 | 4.0 | 4.0 | 4.0 |
| Sulfur, powder | 5.0 | 5.0 | 5.0 | 5.0 |
| Dibenzothiazyl disulfide (MBTS) | 5.0 | 5.0 | 5.0 | 5.0 |
| Polyvinyl chloride (5) | 10.0 | — | — | — |
| Styrene methacrylate (6) | — | 10.0 | — | — |
| Polymethyl methacrylate (7) | — | — | 10.0 | — |
| Calcium carbonate | 43.0 | 43.0 | 43.0 | 53.0 |
| Calcium oxide | 2.5 | 2.5 | 2.5 | 2.5 |
| Antioxidant | 0.5 | 0.5 | 0.5 | 0.5 |
| Tensile shear strength | 9.4 MPa | 9.8 MPa | 11.9 MPa | 8.2 MPa |
| Breaking elongation | 46.7% | 34.1% | 29.5% | 57.3% |
| Tear strength | 8.2 MPa | 7.0 MPa | 9.9 MPa | 7.0 MPa |

(1) Cis-1,4 at least 98%, Mooney viscosity 48 (ML4-100)
(2) MW about 1800, cis-1,4 about 72%
(3) MW about 1800, vinyl about 40–50%
(4) Polybutadiene/maleic anhydride adduct, MW about 1700
(5) Emulsion PVC, K value 70
(6) Styrene copolymer according to DE-A-40 34 725, 7.5% methacrylic acid
(7) PMMA containing copolymerized vinyl imidazole In the tensile shear strength test, cohesive failure was observed with all test specimens.

The only plate thicknesses available for determining adhesion behavior on galvanized steel were the plate thicknesses of 0.8 mm typically used in the automotive industry. However, high-strength structural adhesives of the present examples are already in the strength range of these thin steel plates so that the adhesion behavior on these substrates could only be evaluated by a qualitative peel test. To this end, the steel plates were oiled with ASTM Oil No. 1, coated with the adhesive, oven-cured as described above and then evaluated in a manual peel test. The following substrates were tested: electrolytically galvanized, hot-dip galvanized, galvanized and phosphated and galvannealed steel plates. Cohesive failure was observed in every case.

As can be seen from a comparison of Comparison Example 1 with Comparison Example 2, the tensile shear strength or tear strength of the rubber-based adhesives according to the prior art can be significantly increased solely through a higher content of sulfur, although at the same time there is a drastic reduction in breaking elongation. The addition of polyvinyl acetate copolymer (Example 1) in accordance with the invention produces a significant increase in tensile shear strength but, at the same time, keeps breaking elongation at a high level (26%). As can be seen by comparing Comparison Example 1 (no addition of thermoplastic powder) with Examples 2 to 4, tensile shear strength can be significantly increased by this addition, despite a low sulfur content, through the addition of the various thermoplastic powders with only a very slight reduction in breaking elongation.

What is claimed is:

1. A one-component adhesive composition substantially free of epoxy resin and consisting essentially of:
   (a) at least one liquid rubber having a molecular, weight below 20,000 present in an amount of between 5% and 50% by weight,
   (b) at least one thermoplastic polymer powder having an average particle size below 1 mm present in an amount of between 2% and 20% by weight, said thermoplastic polymer powder being selected from the group consisting of vinyl acetate homopolymers, vinyl acetate copolymers, ethylene/vinyl acetate copolymers, vinyl chloride homopolymers, vinyl chloride copolymers, styrene homopolymers, styrene/methacrylic acid copolymer (meth)acrylate homopolymers, (meth)acrylate copolymers, polyvinyl acetals, and mixtures thereof,
   (c) a vulcanization system for said composition comprised of a vulcanizing agent selected from the group consisting of elemental sulfur, thiuram disulfides, organic peroxides, polyfunctional amines, quinones, p-benzoquinone dioxime, p-nitrosobenzene, dinitrosobenzene and mixtures thereof,
   (d) at least one filler present in an amount of between 10% and 70% by weight, all weights being based on the weight of said composition;
   said composition being curable at a temperature of between 80° C. and 240° C., and when cured, having a breaking elongation according to DIN 53504 of more than about 15% and a tensile shear strength of at least 9.4 mPa and forming a permanent adhesive bond to a metal surface.

2. The composition as claimed in claim 1, further consisting essentially of at least one solid rubber in a quantity of about 1.5% by weight to about 9% by weight, based on the composition as a whole.

3. The composition as claimed in claim 1, further consisting essentially of at least one solid rubber in a quantity of about 4% by weight to about 6% by weight, based on the composition as a whole.

4. The composition as claimed in claim 1, wherein said vulcanization system is comprised of sulfur, at least one organic vulcanization accelerator, and at least one zinc compound.

5. The composition as claimed in claim 1, wherein said vulcanization system comprises about 4% by weight to about 15% by weight of powder-form sulfur, about 2% by weight to about 8% by weight of one or more organic accelerators and about 1% by weight to about 8% by weight of one or more zinc compounds, the percentages by weight being based on the composition as a whole.

6. The composition as claimed in claim 5 wherein the powder-form sulfur comprises about 5% by weight to about 10% by weight of the composition as a whole.

7. The composition as claimed in claim 5 wherein the organic accelerators comprise about 3% by weight to about 6% by weight of the composition as a whole.

8. The composition as claimed in claim 5 wherein the zinc compounds comprise about 2% by weight to about 6% by weight of the composition as a whole.

9. The composition as claimed in claim 5, wherein zinc oxide is one of the zinc compounds.

10. The composition as claimed in claim 1, wherein said thermoplastic polymer powder has an average particle size below about 350 microns.

11. The composition as claimed in claim 1, wherein said thermoplastic polymer powder has an average particle size of between 20 and 100 microns.

12. The composition as claimed in claim 1, wherein said composition is substantially free from plasticizers for the thermoplastic polymer.

13. The composition as claimed in claim 1, further containing an ingredient selected from the group consisting of rheology, aids, extender oils, primers, tackifiers, antiagers and mixtures thereof.

14. A process for the production of the composition claimed in claim 1, comprising the step of high-shear mixing of the components.

15. In a process comprising a step of adhering metal components with a one-component structural adhesive, wherein the improvement comprises adhering said metal components with the composition of claim 1.

16. The improved process claimed in claim 15 wherein the process comprises white-shell assembly in car manufacture.

17. A process for bonding metal parts or for sealing joints between metal parts, comprising the steps of:

coating at least one surface of an at least one first part with the composition claimed in claim 1;

fitting together the at least one first part with an at least one second part to be joined; and heating the fitted parts to a temperature of between 80° C. and 240° C., wherein said heating cures said composition and joins said parts.

18. The process claimed in claim 17 further comprising the step of mechanically joining the fitted parts before the step of heating the fitted parts.

19. A process for coating structural components comprising the steps of:

spraying or extruding the composition claimed in claim 1 onto the surface of a part; and heating the coated part to a temperature of between 80° C. and 240° C., wherein said heating of said part cures the composition.

20. A process for coating, bonding or sealing structural components comprising the steps of:

extruding the composition claimed in claim 1 in the form of a film, cord or tape, applying said extruded composition to at least one first structural component; and heating the structural component or components to a temperature of between 80° C. and 240° C.

21. The process claimed in claim 20 further comprising the step of fitting together the at least one structural component to at least one second structural component before said heating.

22. The composition as claimed in claim 1, having a tensile shear strength of at least 15 mPa.

23. The composition as claimed in claim 1, wherein the liquid rubber has a molecular weight of from 900 to 10,000.

24. The composition as claimed in claim 1, wherein the liquid rubber is selected from the group consisting of polybutadienes, polybutenes, polyisobutylenes, polyisoprenes, styrene/butadiene copolymers, butadiene/acrylonitrile copolymers, and mixtures thereof.

25. The composition as claimed in claim 1, wherein the liquid rubber contains functional groups selected from the group consisting of hydroxy, amino, carboxyl, carboxylic anhydride, epoxy and combinations thereof.

26. The composition as claimed in claim 1 containing at least two liquid rubbers, one liquid rubber having a high percentage of cis-1,4-double bonds and another liquid rubber having a high percentage of vinyl double bonds.

27. A one component adhesive composition substantially free of epoxy resin and consisting essentially of:

(a) at least one liquid rubber having a molecular weight of from 900 to 10,000 present in an amount of between 5% and 50% by weight, said liquid rubber being selected from the group consisting of polybutadienes, polybutenes, polyisobutylenes, polyisoprenes, styrene/butadiene copolymers, butadiene/acrylonitrile copolymers, and mixtures thereof;

(b) at least one thermoplastic polymer powder having an average particle size below 350 µm present in an amount of between 10% and 15% by weight, said thermoplastic polymer powder being selected from the group consisting of vinyl acetate homopolymers, vinyl acetate copolymers, ethylene/vinyl acetate copolymers, vinyl chloride homopolymers, vinyl chloride copolymers, styrene homopolymers, styrene copolymers, (meth)acrylate homopolymers, (meth)acrylate copolymers, polyvinyl acetals, and mixtures thereof;

(c) a vulcanization system comprised of 4% to 15% by weight elemental sulfur, 2% to 8% by weight of one or more organic accelerators, and 1% to 10% by weight of one or more zinc compounds;

(d) at least one filler present in an amount of 25% to 60% by weight;

(e) at least one stabilizer present in an amount of 0.1% to 5% by weight;

(f) at least one solid rubber present in an amount of 1.5% to 9% by weight, all weights being based on the weight of said composition;

said composition being curable at a temperature of between 160° C. and 200° C., and, when cured, having a breaking elongation according to DIN 53504 of more than about 20% and a tensile shear strength of at least 15 mPa and forming a permanent adhesive bond to a metal surface.

28. The composition as claimed in claim 27, wherein at least one solid rubber is selected from the group consisting of polybutadienes, styrene/butadiene rubbers, butadiene/acrylonitrile rubbers, isoprene rubbers, butyl rubbers, and polyurethane rubbers.

29. The composition as claimed in claim 27, wherein at least one solid rubber is a polybutadiene rubber having a percentage of cis-1,4-double bonds above 95%.

30. The composition as claimed in claim 27, wherein at least one thermoplastic polymer has an average particle size from 20 µm to 100 µm and is selected from the group consisting of polyvinyl acetates, ethylene/vinyl acetate copolymers, polyvinyl chlorides, polymethyl methacrylates, and styrene methacrylates.

31. The composition as claimed in claim 27, wherein at least one liquid rubber contains functional groups selected from the group consisting of hydroxyl groups, carboxylic anhydride groups, and combinations thereof.

32. The composition of claim 27 containing at least two liquid rubbers, one liquid rubber having a high percentage of Cis-1,4-double bonds and another liquid rubber having a high percentage of vinyl double bonds.

33. The composition of claim 27, wherein from 1% to 5% by weight calcium oxide is used as one of the fillers.

34. The composition of claim 27 further containing at least one ingredient selected from the group consisting of rheology aids, tackifiers, extender oils, primers, and mixtures thereof.

* * * * *